04-04-72 UK 3,653,748

United States Patent

Athey

[15] 3,653,748

[45] Apr. 4, 1972

[54] COLOR DIVIDER FOR COLOR VIDEO CAMERAS

[72] Inventor: Skipwith W. Athey, Portola Valley, Calif.

[73] Assignee: International Video Corporation, Mountainview, Calif.

[22] Filed: Dec. 26, 1968

[21] Appl. No.: 787,042

[52] U.S. Cl. ....................350/171, 95/12.20, 178/5.4 E, 350/166

[51] Int. Cl. ....................G02b 27/14, G02b 5/28

[58] Field of Search ....................350/171, 173, 166, 169; 178/5.4 E, 7.86; 95/12.20

[56] References Cited

UNITED STATES PATENTS

| | | | |
|---|---|---|---|
| 3,293,357 | 12/1966 | Doi et al. | 178/5.4 E |
| 3,585,281 | 6/1971 | Jordan | 178/5.4 E |
| 2,560,351 | 7/1951 | Kell et al. | 350/171 X |
| 2,604,808 | 7/1952 | Sachtleben | 350/171 X |
| 3,017,454 | 1/1962 | James et al. | 350/171 X |
| 3,349,170 | 10/1967 | Farnholz et al. | 178/5.4 |

*Primary Examiner*—David Schonberg
*Assistant Examiner*—John W. Leonard
*Attorney*—Limbach, Limbach & Sutton

[57] ABSTRACT

A color divider for color video cameras in which color separation is obtained by interposing two dichroic mirrors in the optical path of the camera for reflecting two of the three primary colors out of the optical path. Two more mirrors reflect the initially reflected light along paths parallel to the optical path so that the three primary colors are directed along three parallel paths to three video detectors. The two additional mirrors are also dichroic mirrors which function to eliminate light of certain wave lengths from the light transmitted to two of the detectors so that ideal taking characteristics are obtained for the NTSC type color system without gelatin filters.

4 Claims, 12 Drawing Figures

INVENTOR
SKIPWITH W. ATHEY
BY Limbach & Limbach
ATTORNEYS

INVENTOR.
SKIPWITH W. ATHEY
BY Limbach & Limbach
ATTORNEYS

INVENTOR.
SKIPWITH W. ATHEY
BY Limbach & Limbach
ATTORNEYS

INVENTOR.
SKIPWITH W. ATHEY
BY Limbach & Limbach
ATTORNEYS

INVENTOR.
SKIPWITH W. ATHEY

Limbach & Limbach
ATTORNEYS

COLOR DIVIDER FOR COLOR VIDEO CAMERAS

Color television cameras have been manufactured heretofore employing relay optical systems which provide space in the optical path for splitting the incoming light from a scene into three portions to be picked up, respectively, in the red, green and blue channels by three vidicons or other optical detectors. The color dividers employed in these cameras have been fairly expensive to manufacture and to maintain for a number of reasons. Thus, many of these cameras employ gelatin or other absorptive filters which reduce the light available to the several detectors and/or age in characteristics with the use of the camera as well as precise adjustable mountings for optical components in the camera which, while permitting post-manufacture adjustment of the camera, seriously increase initial manufacturing cost.

In accordance with this invention, I have provided a color divider which may be used in a relay optical system for color video cameras where color division is effected by interposing in the path of incoming light a red reflector dichroic mirror and a blue reflector dichroic mirror which laterally reflect the red and blue light, respectively, transmitting green light to one vidicon. The red and blue lights are re-reflected by additional mirrors to red and blue vidicons, respectively, and the additional mirrors are also dichroic mirrors which function as described below to provide ideal taking characteristics for the NTSC or other color transmission system without the use of any gelatin filters.

As is known in the art, a dichroic mirror is an optically transparent support such as plane-parallel glass plate coated with a dichroic coating for re-reflecting a selected portion of the electromagnetic spectrum. For the case of a plane parallel substrate or support, the back side of the mirror is preferably provided with a high-efficiency low-reflection coating. Such a dichroic coating is generally made of many layers of optically transparent materials of different refractive indices which act analogously to quarter wave electrical transmission lines.

The four dichroic mirrors employed in the color divider of this invention are of the substantially plane parallel plate type rigidly mounted on a single rigid base by cementing the sections of the mirror plates extending beyond the optically useful area of each to the base while the mirrors are in the precise optical alignment required for the color divider. This precise optical alignment is obtained by initially mounting the mirrors in place with precision tools and holding the mirrors with those tools while the mirrors are cemented to the base. It has been found that by employing this method, the mirror assemblies of the color dividers can be manufactured with such precision that they may be employed as interchangeable subassemblies in color video cameras, and at the same time, the cost of manufacture of the color divider is significantly reduced.

The dichroic mirrors are mounted in such a manner that a relatively low angle of incidence is provided between the optical axis and the normal to the mirror so that the sensitivity of the mirrors to changes in selective reflection characteristics with changes in angle of incidence of light on the mirror and in the plane of polarization of the incident light are reduced.

Other features and advantages of the invention will become apparent from the following description read in conjunction with the attached drawing in which.

Figure 1:
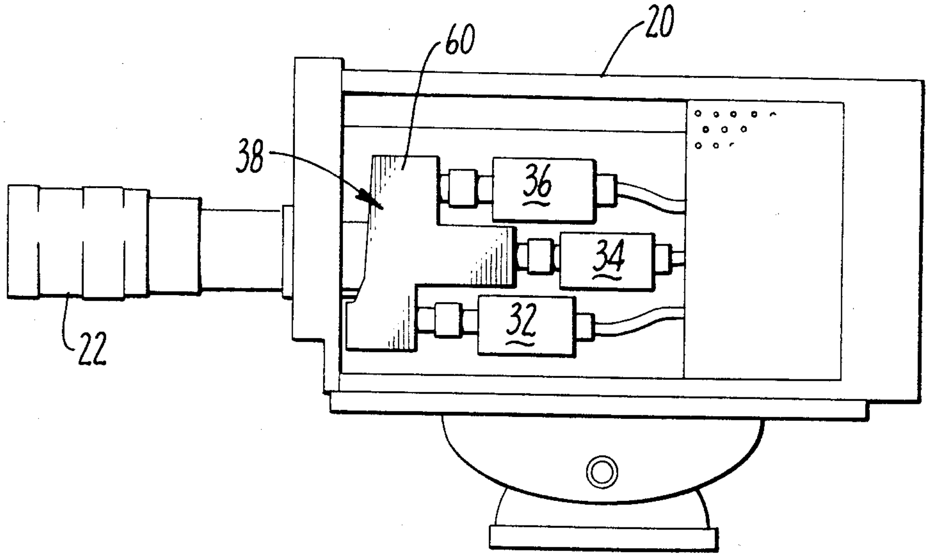
FIG. 1 is a view in side elevation of a color video camera with one side removed showing the general location of the color divider of this invention.
Figure 2:
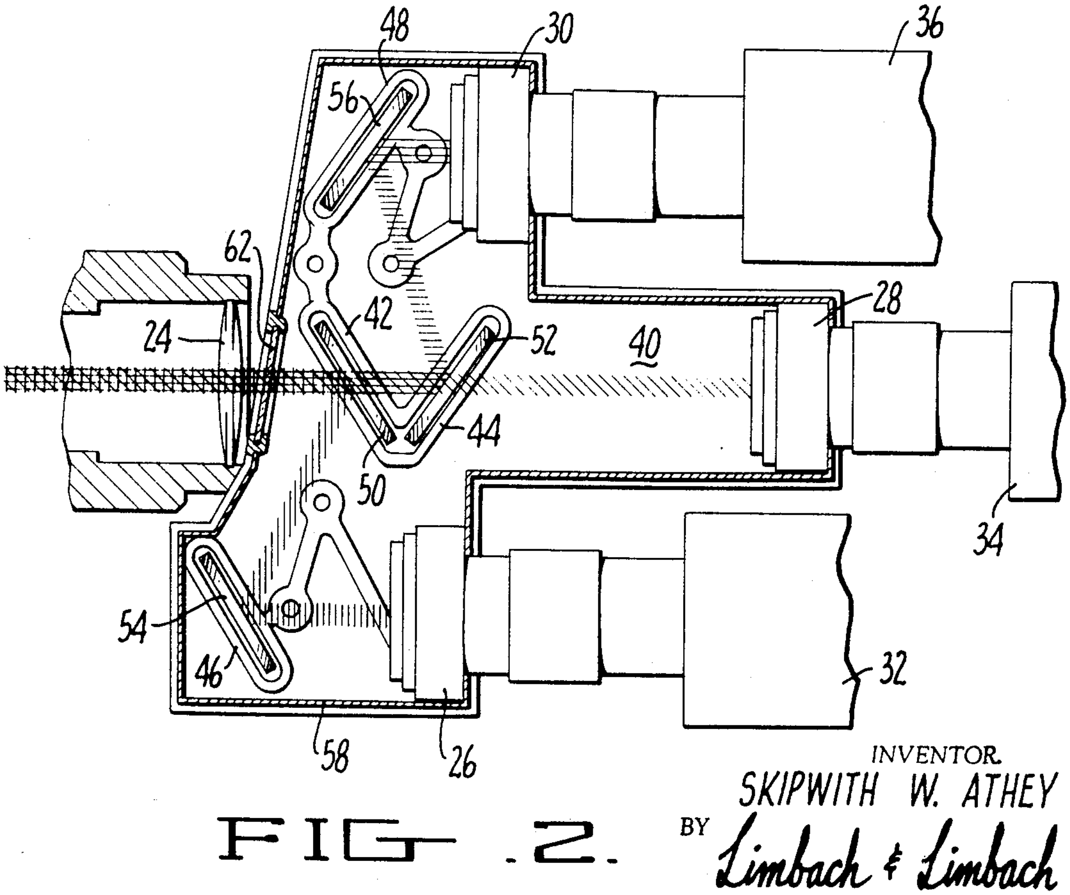
FIG. 2 is an enlarged vertical sectional view of the color divider employed in the camera of FIG. 1.

Referring now in detail to the drawings and particularly to FIGS. 1 and 2, a color television camera 20 is provided with an input lens system 22 which focuses an image in a field lens 24. The image in the objective lens is relayed by three relay lenses 26, 28 and 30 to three vidicons 32, 34 and 36. Interposed between the objective lens 24 and the relay lenses 26–30 is a color divider 38 which is illustrated in greater detail in FIG. 2.

The color divider includes a rigid base plate 40 which is provided with four mirror support areas 42, 44, 46 and 48 in which are mounted a red reflector dichroic 50, a blue reflector dichroic mirror 52, a red corrector dichroic mirror 54, and a blue corrector dichroic mirror 56. As explained in greater detail hereinafter, the mirrors 50–56 are rigidly cemented in the mirror support portions 42–48 by means of an epoxy resin.

A side wall 58 is provided surrounding the color divider provided with an input window adjacent to field lens 24 and the three necessary exit windows which may be provided by the relay lenses 26–30. A cover plate 60 covers the top of side wall 58 to enclose the color divider and keep it dust free, and an input window 62 which may act also as an absorptive filter is preferably mounted in the input aperture adjacent to the field lens 24 to render the color detector completely dust free and if necessary to eliminate from the color detector infrared radiation to which the vidicons 32–36 may be sensitive.

Figure 12:
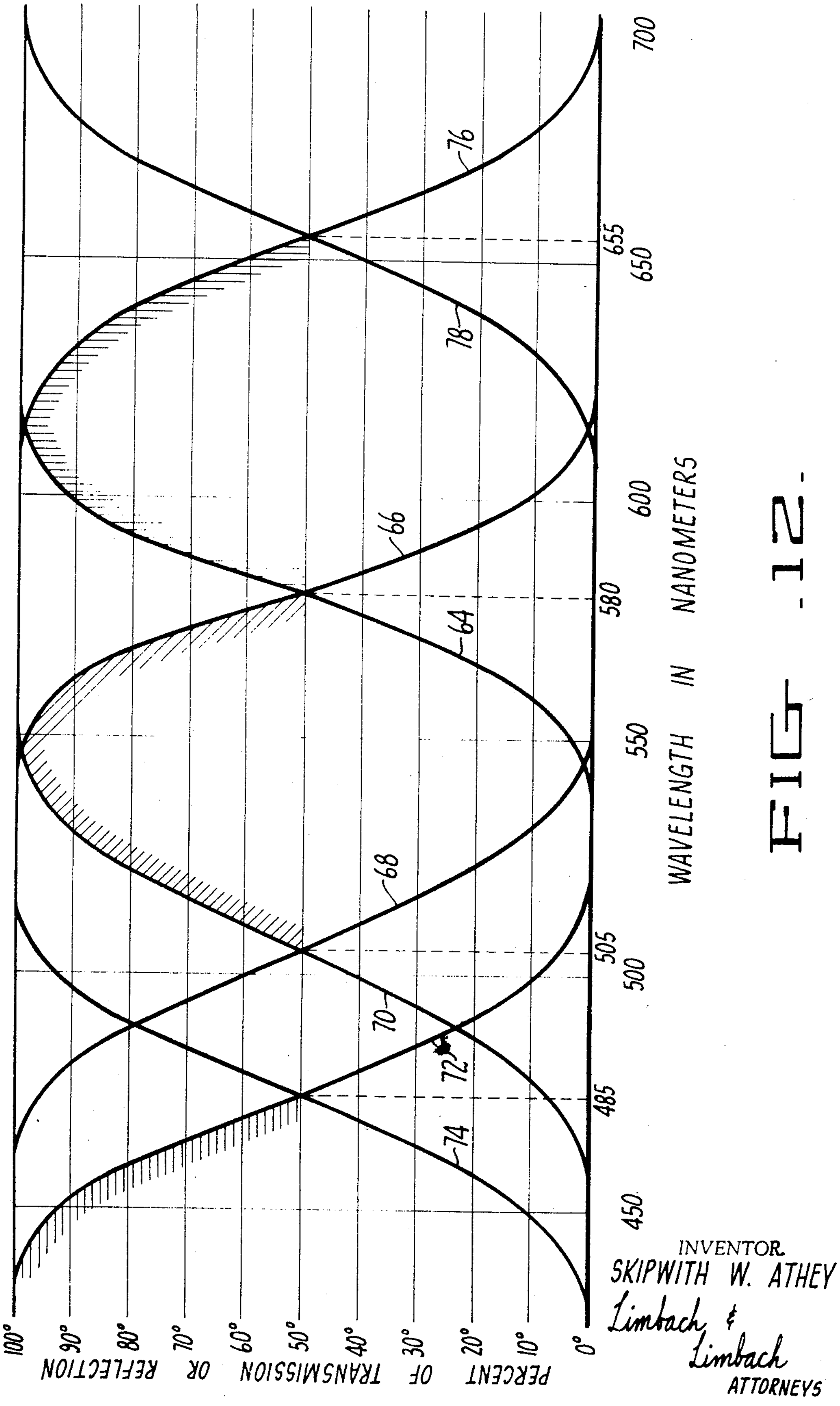
FIG. 12 is a graph of the color transmission and reflection characteristics of the four dichroic mirrors employed in the apparatus of FIGS. 1–11 illustrating the manner in which these dichroic mirrors control the taking characteristics of the camera in which the color divider is used.

With reference to FIGS. 2 and 12, the red reflector mirror 50 has a reflection spectral characteristic indicated by line 64 in FIG. 12 and a complementary transmission spectra indicated by line 66 in FIG. 12. This mirror has a crossover wave length typically of 580 nanometers so that the light reflected from mirror 50 toward mirror 46 contains wave lengths predominantly above 580 nanometers in the red portion of the spectrum while the light having wave lengths below 580 nanometers in the green and blue portions of the spectrum is transmitted through mirror 50 to mirror 52.

The reflection and transmission characteristics of the blue reflector mirror 52 are indicated by the lines 68 and 70 in FIG. 12, which have a crossover point at 505 nanometers so that light having wave lengths below 505 nanometers in the blue and blue-green area of the spectrum is reflected from mirror 52 to mirror 56 while the green light having wave lengths above 505 nanometers is transmitted through mirror 52 to green vidicon 34. The light reflected by mirrors 50 and 52 is re-reflected by mirrors 54 and 56, respectively, to the red and blue vidicons 32 and 36.

While the color divider as thus far described might be operative to provide a color separation for color video pictures, I have found that ideal taking characteristics for the NTSC system will not be obtained where both of the mirrors 54 and 56 are totally reflecting mirrors. A dichroic mirror is preferably used for the mirror 56 to prevent light in the blue-green portion of the spectrum from reaching the blue vidicon 36, and a dichroic mirror is preferably used for the mirror 54 to prevent high red and infrared radiation from reaching the red vidicon 32. It may be possible to use a totally reflecting mirror in place of the dichroic mirror 54 where sufficient elimination of the high wave length red and infrared radiation is obtained in window 62, but the dichroic mirror 54 is preferred.

Referring again to FIG. 12, the reflection and transmission characteristics of blue corrector mirror 56 are illustrated by lines 72 and 74 which have a crossover point at 485 nanometers so that blue light with wave lengths below 485 nm is transmitted to the blue vidicon 36 while blue-green light between 485 nm and 505 nm is transmitted through the mirror 56 to be absorbed typically in the black painted side wall 58.

The reflection and transmission characteristics of the red reflector mirror 54 are indicated by lines 76 and 78 in FIG. 12 which have a crossover point at 655 nanometers so that only red light having wave lengths below 655 nm is reflected by the mirror 54 to red vidicon 32, and the majority of red and infrared radiation with wave lengths higher than 655 nm is transmitted through mirror 54 to be absorbed typically in side walls 58.

Figure 3:
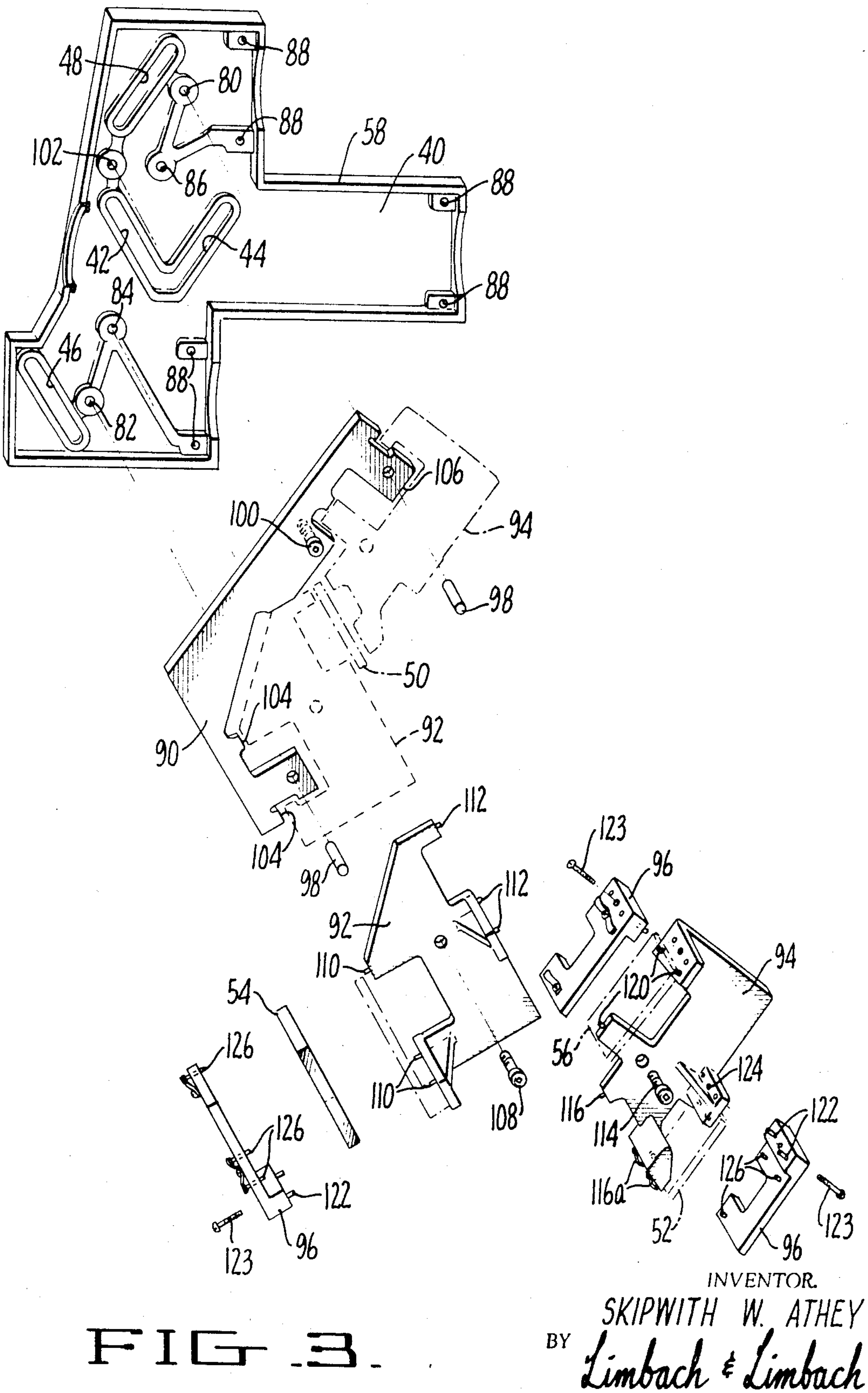
FIG. 3 is an exploded view of the color divider base and precision tools employed in the method of making the color dividers of this invention.
Figure 4:
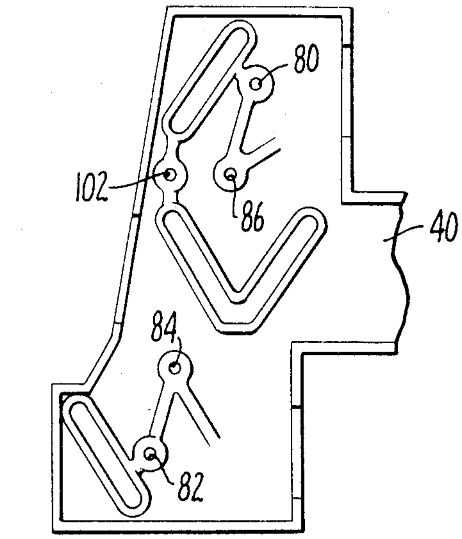
FIGS. 4, 5, 6, 7, 8 and 9 are plan views of the apparatus of FIG. 3 taken at sequential stages in the method of making color dividers in accordance with this invention.

The tooling employed for the method of making the color divider in accordance with this invention is illustrated in FIG. 3 where the base 40 is illustrated with its side walls 58 and entrance window 62 although the side walls and filter are not present during mounting of the mirrors 50 and 56. It will be noted in FIG. 3 that the mirror support portions 42 – 48 on the base 40 take the form of shallow pockets formed by slightly raised ribs surrounding the pockets. The base also includes mounting holes 80, 82, 84 and 86 by which precision fabrication tools may be mounted on the base 40 and by which the base 40 may later be mounted in the video camera 20 in the position illustrated in FIG. 1. Finally, the base 40 includes mounting holes 88 to which supports for the relay lenses 26–30 and vidicons 32–36 may be attached to accurately position these lenses and vidicons with respect to the mirrors of the color divider.

As illustrated in FIG. 3, the tools which are employed for mounting the mirrors 50–60 on the base 40 include an indexing member 90, a first mirror holder 92, a second mirror holder 94, and mirror support plates 96.

Figure 5:
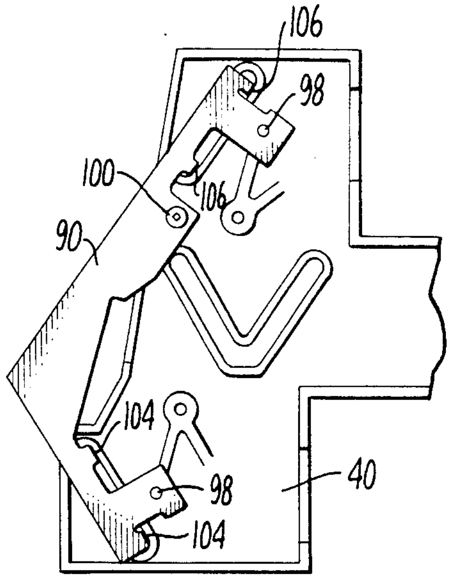
Figure 6:
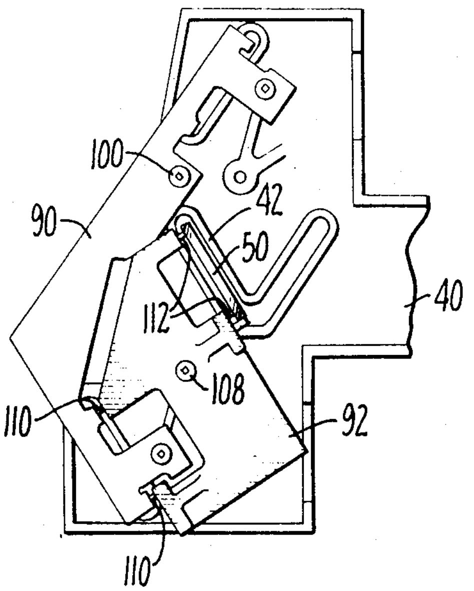

When assembly of the color divider is begun, the indexing member 90 is rigidly attached to a base plate 40 by means of a screw 100 as illustrated in FIG. 5 while two indexing pins 98 accurately locate the indexing member 90 as they fit into indexing holes 80 and 82. The indexing member 90 has two pairs of precision mounting faces 104 and 106 which, when the indexing member 90 is mounted on the base 40, are located precisely at the location with respect to the base 40 which the reflecting surface of mirrors 54 and 56 should occupy.

The mirror holder 92 is then rigidly attached to the base 40 by means of a screw 108 received in mounting hole 84. At this point, it should be noted that mirror holder 92 is a rigid accurately machined piece which carries on one face a set of three locating dowels 110 best seen in FIG. 3 and on an opposite face three locating dowels 112. The outside ends of the dowels 110 and 112 are accurately machined to define two planes which are absolutely parallel to each other so that when the mirrors 50 and 54 are supported in engagement with the pins 112 and 110, respectively, the mirrors will be absolutely parallel to each other. When the mirror holder 92 is screwed onto the base 10 it is located with its lower two pins 110 engaging the accurately machined surfaces 104 (FIG. 5) of the indexing tool 90.

The planes defined by the two sets of pins are also machined accurately perpendicular to the mounting surface defined by the portion of the raised sections of the mirror support portions 42, 44, 46 and 48 as well as the other bosses supporting mounting holes 84, 86 and 102 and indexing holes 80 and 82. This latter surface is in turn machined accurately parallel to the main camera structure which receives the color divider plate 40.

Figure 7:
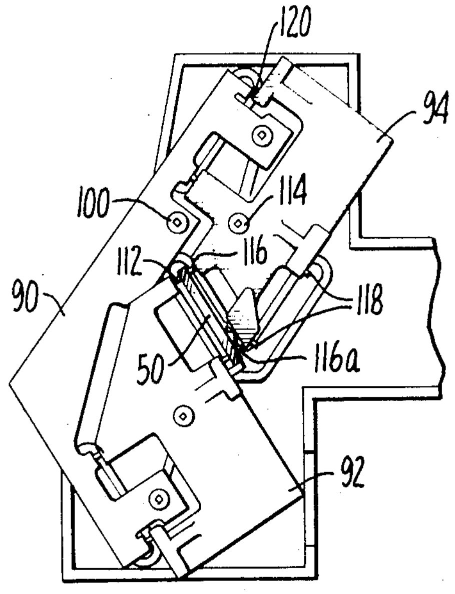
Figure 8:
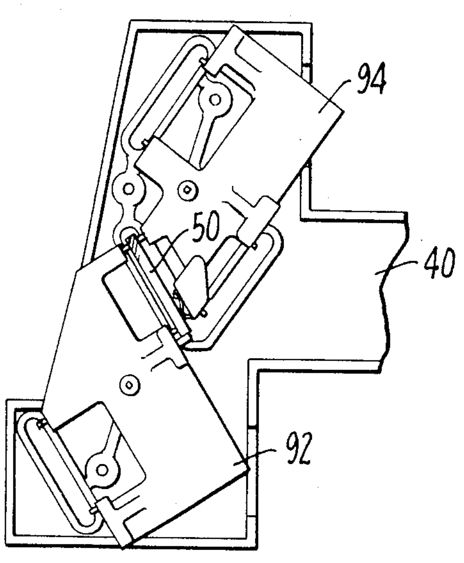

With the mirror holder 92 located as described above, the mirror 50 is set in place in mirror support area 42, and the second mirror holder 94 is placed approximately as shown in FIG. 7.

One member of the dowel set 116 is rigidly mounted in mirror holder 94 and the other two are spring loaded to move perpendicular to the plane they define approximately. Mirror holder 94 is moved so as to position two of the dowel sets 120 against the surface 106 of indexing tool 90 and then slid over toward mirror 50 until the rigidly mounted member of dowel set 116 contacts mirror 50. The spring loaded members of dowel sets 116 then firmly press mirror 50 against dowel set 112 of mirror holder 92. As illustrated in FIGS. 3 and 7, the above-mentioned dowel set 116 includes a single dowel 116 opposite one of the dowels 112 and a pair of springs 116*a* opposite the other pair of dowels 112. The mirror holder 94 has two other sets of mirror locating dowels 118 and 120 with three dowels in each set similar to the sets 110 and 112 described above. The ends of the dowels 118 and 120 are accurately machined to define two planes which are absolutely parallel to each other and are positioned where the reflecting faces of mirrors 52 and 56 should be located while dowels 116 engage the back side of mirror 112.

Figure 9:
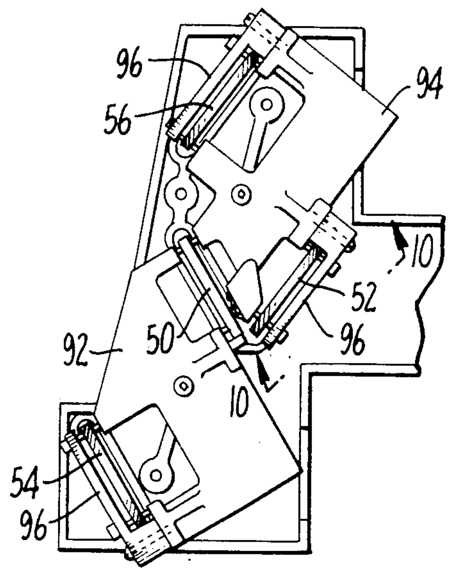
Figures 10, 11:
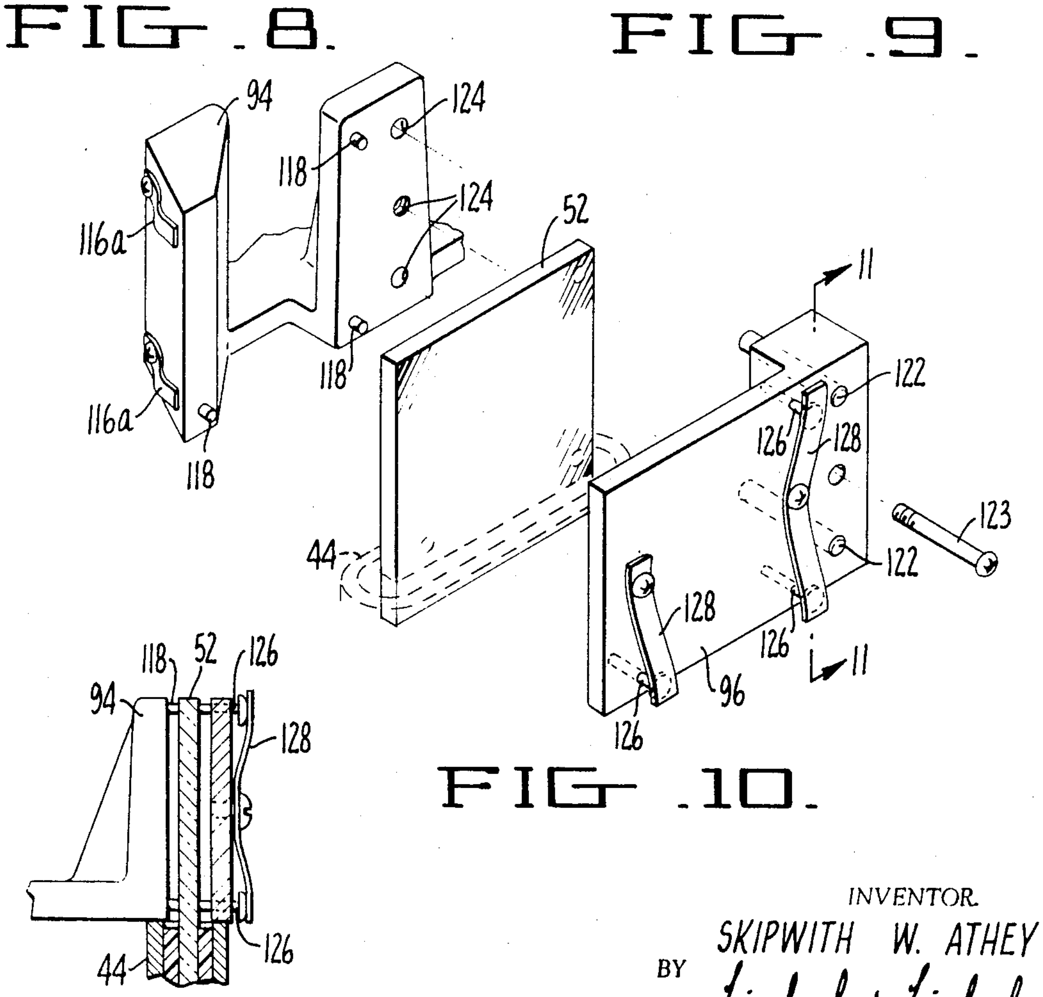
FIG. 10 is an exploded view of a portion of the apparatus of FIG. 9 as indicated at 10—10 in FIG. 9.
FIG. 11 is a sectional view taken along the plane indicated at 11—11 in FIG. 10.

With the two mirror holders 92 and 94 mounted on the base 40 as described above, the indexing tool 90 is removed from the base 40 by removing the screws 98 and lifting the indexing tool so that the indexing tool may then be used immediately in the fabrication of additional color dividers. At this point in the process of assembly of the color divider, the two mirror holders 92 and 94 are mounted on the base 40 with the mirror 50 held between them. The remaining mirrors 52, 54 and 56 are then mounted in place and supported in place by mirror holding brackets 96 as illustrated in FIG. 9. Since the mirror holding brackets 96 are all substantially similar to each other, the structure of all of them will be apparent from FIGS. 10 and 11 which illustrate the mirror holding bracket 96 which is employed to support the mirror 52 in engagement with the locating dowels 118 on mirror holder 94.

The mirror holding bracket 96 is accurately located on the mirror holder 94 by a pair of locating pins 122 and rigidly mounted on the mirror holder 94 by means of a screw 123 with the pins and screw received in apertures 124 in mirror holder 94. Extending through the bracket 96 are three support pins 126 aligned with the dowels 118 and resiliently urged toward dowels 118 by springs 128. In this way, the mirror 52 is accurately held by mounting pins 118 with the bottom edge of the mirror in support portion 44 of the base 40. This method of restraining the mirrors while cementing them locates the position of the reflecting plane without applying any bending forces which could distort the plane surface. When all of the mirrors 52, 54 and 56 are thus supported by brackets 96, the support portions 44, 46 and 48 may be filled with a liquid cement such as an epoxy resin, the support area 42 preferably having been filled before the mounting of the mirror mount 94.

Finally, the color divider, assembled as described above, may be set aside to permit the cement to cure, a process which may be accelerated by placing in an oven, and after curing of the cement the mirror holders 92 and 94 may be removed from the base 40 by removing the screws 108 and 114 and sliding the mirror holders along the base mounting plate until one set of dowels passes beyond the mirror surface. Then the holders may be rotated so as to remove all of the dowels from contact with the mirrors and the holders can then be lifted upwardly away from the base.

While certain features and advantages of the invention have been described in detail herein, it is obvious that many modifications thereof may be made without departing from the spirit and scope of the invention.

I claim:

1. An optical color divider for separating polychromatic light in a first path into three color components in three separate paths which comprises:

A. a first partially reflecting mirror mounted in said first path and inclined thereto for reflecting out of said path a portion of the spectrum of light in said path and transmitting another portion of the spectrum of light in said path, said first mirror comprising a dichroic mirror constructed to reflect the majority of light having wave lengths above about 580 nanometers and transmit the majority of light having wave lengths below about 580 nanometers;

B. a second partially reflecting mirror mounted in said path in a position to intercept light transmitted through said first mirror with said second mirror inclined to said path for reflecting out of said path a portion of the spectrum of light transmitted through said first mirror and transmitting another portion of the spectrum of light transmitted through said first mirror, said second mirror comprising a dichroic mirror constructed to reflect the majority of light having wave lengths below about 505 nanometers and transmit the majority of light having wave lengths above about 505 nanometers;

C. a third mirror parallel to said first mirror and mounted outside of said first path for reflecting parallel to said path light reflected by said first mirror, said third mirror comprising a partially reflecting mirror for reflecting part of the spectrum of light incident thereon and transmitting part of the spectrum of light incident thereon; and D. a fourth mirror parallel to said second mirror and mounted outside of said first path for reflecting parallel to said path light reflected by said second mirror, said fourth mirror comprising a dichroic mirror constructed to reflect the majority of light having wave lengths below about 485 nanometers and transmit the majority of light having wave lengths above about 485 nanometers.

2. The color divider of claim 1 characterized further by the inclusion of a single piece integral body having four mirror support pockets therein with one edge of each of said mirrors positioned in one of said pockets, and a body of cementitious material in each of said pockets rigidly bonding said body to the edge of the mirror in said pocket with the mirror projecting laterally from said body.

3. The optical divider of claim 1 characterized further in that said third mirror is a dichroic mirror constructed to reflect the majority of light having wave lengths less than about 655 nanometers and transmit the majority of light having wave lengths greater than about 655 nanometers.

4. The color divider of claim 3 characterized further by the inclusion of a single piece integral body having four mirror support pockets therein with one edge of each of said mirrors positioned in one of said pockets, and a body of cementitious material in each of said pockets rigidly bonding said body to the edge of the mirror in said pocket with the mirror projecting laterally from said body.

* * * * *